(12) United States Patent
Harris et al.

(10) Patent No.: US 11,281,934 B2
(45) Date of Patent: Mar. 22, 2022

(54) IDENTIFICATION AND TRACKING OF INTERNET MEMES

(71) Applicant: Gfycat, Inc., San Francisco, CA (US)

(72) Inventors: Jeffrey Harris, Alberta (CA); Daniel McEleney, Edmonton (CA); Harrison John Dodini, Fairfield (CA); Ernestine Fu, Northridge (CA)

(73) Assignee: Gfycat, Inc., Palo Alto, CA (US)

( * ) Notice: Subject to any disclaimer, the term of this patent is extended or adjusted under 35 U.S.C. 154(b) by 11 days.

(21) Appl. No.: 16/799,641

(22) Filed: Feb. 24, 2020

(65) Prior Publication Data

US 2021/0264193 A1   Aug. 26, 2021

(51) Int. Cl.
  *G06K 9/00* (2006.01)
  *G06K 9/62* (2022.01)
  *G06K 9/46* (2006.01)
  *H04L 67/02* (2022.01)

(52) U.S. Cl.
  CPC ............ *G06K 9/6202* (2013.01); *G06K 9/46* (2013.01); *G06K 9/6215* (2013.01); *G06K 9/6267* (2013.01); *G06K 2209/01* (2013.01); *H04L 67/02* (2013.01)

(58) Field of Classification Search
  CPC ...... G06K 9/6202; G06K 9/46; G06K 9/6215; G06K 9/6267; G06K 2209/01; H04L 67/02
  See application file for complete search history.

(56) References Cited

U.S. PATENT DOCUMENTS

| 9,779,169 | B2* | 10/2017 | Bonchi ............... G06F 16/9535 |
| 10,394,953 | B2 | 8/2019 | Satyavarta et al. |
| 10,956,746 | B1* | 3/2021 | Huang ............... G06K 9/00718 |
| 2011/0119293 | A1 | 5/2011 | Taylor et al. |

(Continued)

FOREIGN PATENT DOCUMENTS

KR    102048638 B1    11/2019

OTHER PUBLICATIONS

Milo et al. SimMeme: A Search Engine for Internet Memes, 2019 IEEE 35th International Conference on Data Engineering (ICDE) p. 974-985 (Year: 2019).*

(Continued)

*Primary Examiner* — Ping Y Hsieh
*Assistant Examiner* — Xiao Liu
(74) *Attorney, Agent, or Firm* — Schwegman Lundberg & Woessner, P.A.

(57) ABSTRACT

In a method for identification of an Internet meme, a plurality of sources is monitored for digital visual content comprising a visual moment and a caption. It is determined whether instances of digital visual content include a same visual moment. Provided the instances of digital visual content include the same visual moment, the instances of digital visual content including the same visual moment are identified as similar digital visual content. Each instance of the similar digital visual content is tracked. Provided a total number of instances of the similar digital visual content exceeds an Internet meme threshold, the similar digital visual content is identified as an Internet meme, wherein the same visual moment is a root visual moment and each caption corresponds to a different iteration of the Internet meme.

16 Claims, 9 Drawing Sheets

(56) References Cited

U.S. PATENT DOCUMENTS

| | | | |
|---|---|---|---|
| 2012/0102021 A1* | 4/2012 | Hill | G06F 16/70 |
| | | | 707/711 |
| 2013/0016916 A1 | 1/2013 | Mass et al. | |
| 2017/0017638 A1* | 1/2017 | Satyavarta | G06F 40/30 |
| 2017/0109360 A1 | 4/2017 | Hill et al. | |
| 2017/0330363 A1* | 11/2017 | Song | G06T 13/80 |

OTHER PUBLICATIONS

Peirson V et al Dank Learning: Generating Memes Using Deep Neural Networks, arXiv:1806.04510v1 Jun. 8, 2018.*

Deza et al Understanding Image Virality, arXiv:1503.02318v3 May 26, 2015.*

McParlane et al, "Picture the scene . . . "; Visually Summarising Social Media Events, CIKM'14, Nov. 3-7, 2014, pp. 1459-1468 (Year: 2014).*

"International Application Serial No. PCT/US2021/019279, International Search Report dated Jun. 11, 2021", 3 pgs.

"International Application Serial No. PCT/US2021/019279, Written Opinion dated Jun. 11, 2021", 4 pgs.

* cited by examiner

IDENTIFICATION AND TRACKING OF INTERNET MEMES

BACKGROUND

The proliferation of access to the Internet has significantly expanded participation in social networks and social media platforms as a means of sharing information. Internet memes are an example of information that is shared over the Internet, typically using social networks and social media platforms. Internet memes are pieces of digital media (e.g., digital images or digital video clips) combined with a text word or phrase to convey or represent a particular theme or meaning. Internet memes can be used to promote or share different types of information, including humor, news, entertainment, etc. An objective of many Internet meme creators and promotors is to have an Internet meme become "viral," where sharing of a viral Internet meme proliferates quickly over a short period of time.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical circuit. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "monitoring," "determining," "identifying," "tracking," "generating," "comparing," "maintaining," "calculating," or the like, refer to the actions and processes of an electronic device such as: a processor, a memory, a computing system, a mobile electronic device, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example fingerprint sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example computer system upon which embodiments of the present invention may be implemented. Example systems and components for identification and tracking of Internet memes are then described. Example operations for identification and tracking of Internet memes are then described.

The proliferation of access to the Internet has significantly expanded participation in social networks and social media platforms as a means of sharing information. Internet memes are an example of information that is shared over the Internet, typically using social networks and social media platforms. Internet memes are pieces of digital media (e.g., digital images or digital video clips) combined with a text word or phrase to convey or represent a particular theme or meaning. Internet memes can be used to promote or share different types of information, including humor, news, entertainment, etc. An objective of many Internet meme creators and promotors is to have an Internet meme become "viral," where sharing of a viral Internet meme proliferates quickly over a short period of time.

Currently, it is very difficult to measure or determine virality of Internet memes. In particular, conventional methods for measuring how viral an Internet meme is are typically based on subjective analysis performed after an Internet meme has obtained some level of recognition or notoriety. Moreover, conventional methods for measuring virality of Internet memes are typically platform specific, and do not reflect how viral an Internet meme is on other platforms. For instance, Internet memes are typically shared over multiple social networks and social media platforms. As sharing of an Internet meme proliferates across multiple social networks and social media platforms, the ability to track and measure instances of Internet memes breaks down, due to the diffuse nature of the proliferation.

Embodiments described herein provide methods and systems for identifying and tracking Internet memes. As utilized herein, and for the purposes of the described embodiments, an Internet meme is defined as a piece of digital visual media content (e.g., an image or a short video clip) that includes a caption (e.g., a text word, phrase, emoji, or other type of visual emphasis). Identification of an Internet meme includes determining the underlying piece of digital visual media content, also referred to herein as a "moment," where the moment can be used as a template for creating different iterations of the Internet meme. In other words, an Internet meme includes an underlying moment that is captioned using different visual emphasis, where each iteration of the moment is an iteration of the Internet meme. An example of an Internet meme is an image of the actor Gene Wilder exhibiting a condescending look in his role as Willy Wonka captioned with different text, where each different instance of a text caption is a different iteration of the same Internet meme.

Identification of Internet memes allows for tracking of objective measurements of the proliferation of Internet memes, which can be used to objectively measure how virality of Internet memes. Such information would provide insight into the performance of Internet memes to the creators and promotors of Internet memes, allowing creators and promoters to understand the effectiveness and reach of particular Internet memes.

In accordance with various embodiments, methods and systems for identifying and tracking Internet memes are provided. In a method for identification of an Internet meme, a plurality of sources is monitored for digital visual content comprising a visual moment and a caption. It is determined whether instances of digital visual content include a same visual moment. Provided the instances of digital visual content include the same visual moment, the instances of digital visual content including the same visual moment are identified as similar digital visual content. Each instance of the similar digital visual content is tracked. Provided a total number of instances of the similar digital visual content exceeds an Internet meme threshold, the similar digital visual content is identified as an Internet meme, wherein the same visual moment is a root visual moment and each caption corresponds to a different iteration of the Internet meme.

Embodiments described herein pertain to identification Internet memes by determining whether digital visual contents are visually the same or similar. In one embodiment, the digital visual contents are digital images. In other embodiments, the digital visual content are video files, such as Graphics Interchange Format (GIF) files. It should be appreciated that other types of prerecorded media files, such as other types of image and video files, can be used herein. Moreover, it should be appreciated that any type of media file format can be used in accordance with the described embodiments, including but not limited to GIF, WebM, WebP, MPEG-4 (MP4), Animated Portable Network Graphics (APNG), Motion JPEG, Flash video (FLV), Windows Media video, M4V, etc. It should be appreciated that video content item can be looped (e.g., via a HTML 5 video element or Flash video element) to automatically repeat. In some embodiments, the video content item is a short form looping video file (e.g., less than 60 seconds).

In some embodiments, the plurality of sources monitored includes known websites and social media platforms, such as Facebook, Instagram, Gfycat, Twitter, etc. In some embodiments, an instance of digital visual content that is identified as an Internet meme is received for comparison to instances of digital visual content from monitored websites and social media platforms.

In accordance with some embodiments, perceptual hashes are used to determine similarity of instance of digital visual content. Perceptual hashing, as utilized herein, refers to an algorithm or function that is applied to a media file for generating a fingerprint or signature for the media file where the greater the similarity between two media files, the greater the similarity between the perceptual hashes for the two media files. In some embodiments, the output of a perceptual hashing function is a string or sequence, referred to herein as a perceptual hash. For example, two images that are visually similar to a person will have perceptual hashes that are similar, while two images that are visually much different to a person will have perceptual hashes that are less similar. Perceptual hashing can be contrasted with cryptographic hashing where slight variances in the input drastically change the output. Perceptual hashing is useful in determining whether two images are similar. Example perceptual hash functions include phash and dhash, but other types of perceptual hash functions exist and may be utilized herein, in accordance with the described embodiments. In various embodiments, perceptual hashing is utilized in the context of video files by generating perceptual hashes for frames of the video files.

In accordance with various embodiments described herein, similarity between media files, e.g., images or frames of videos, is determined by comparing perceptual hashes for the media files. An edit distance, also referred to herein as a "distance," between the perceptual hashes is determined. As utilized herein, an edit distance refers to a measure of difference between two sequences or strings. For example, edit distance is a measurement of how dissimilar two strings or sequences are to one another by counting the minimum number of operations required to transform one string into the other. Various types distance determinations may be utilized in accordance with the described embodiments, including and without limitation, the Levenshtein distance, the Hamming distance, the Damerau-Levenshtein distance, and the longest common sequence (LCS).

In some embodiments, to determine whether instances of digital visual content include a same visual moment, perceptual hashes are generated for each instance of the digital visual content. Perceptual hashes for each instance of the digital visual content are compared to determine a distance between the perceptual hashes. Provided the distance between two perceptual hashes satisfies a similarity threshold, it is determined that the instances of digital visual content corresponding to the perceptual hashes include the same visual moment. In some embodiments, provided the distance between two perceptual hashes satisfies the similarity threshold, the instances of digital visual content corresponding to the perceptual hashes are identified as similar digital visual content.

In some embodiments, once an Internet meme is identified, instances of digital visual content can be compared to the Internet meme to determine if the instances of digital visual content are also the Internet meme. Provided an instance of digital visual content satisfies a similarity threshold with an Internet meme, the instance of digital visual content is identified as an instance of the Internet meme. In some embodiments, it is determined whether instance of the Internet meme is identical to another instance of the Internet meme. Provided the instance of the Internet meme is not identical to another instance of the Internet meme, it is determined that the instance of the Internet meme is a new iteration of the Internet meme. Provided the instance of the Internet meme is identical to another instance of the Internet meme, it is determined that the instance of the Internet meme is another instance of an existing iteration of the Internet meme.

In accordance with various embodiments, metrics corresponding to each instance of the Internet meme is tracked for use in generating objective analytics for determine virality of the Internet meme. In some embodiments, each instance of the Internet meme is tracked at the plurality of sources. Each iteration of the Internet meme is tracked. A reach of each iteration of the Internet meme is determined, wherein the reach of each iteration of the Internet meme corresponds to engagement with each iteration of the Internet meme. In some embodiments, a viral score for each Internet meme is calculated, the viral score comprising a first component associated with the reach of each iteration of the Internet meme and a second component associated with a number of iterations of each Internet meme.

As presented above, identification and tracking of Internet memes is important for determining the reach an effectiveness of Internet memes. Providing objective measurements on the virality of a meme is important for facilitating the creation and promotion of Internet memes. In particular, providing measurable data on the volume and exposure of Internet memes improves the accuracy of the performance of an Internet meme, providing insight to Internet meme creators and promotors that was not previously available. Hence, the embodiments of the present invention greatly extend beyond conventional methods of identification and tracking of Internet memes. Moreover, embodiments of the present invention amount to significantly more than merely using a computer to perform identification and tracking of Internet memes. Instead, embodiments of the present invention specifically recite a novel process, rooted in computer technology, utilizing objective identification and tracking of Internet memes across multiple websites and social media platforms to determine an objective determination of virality of Internet memes.

Example Computer System and Communication Network

Figure 1A:
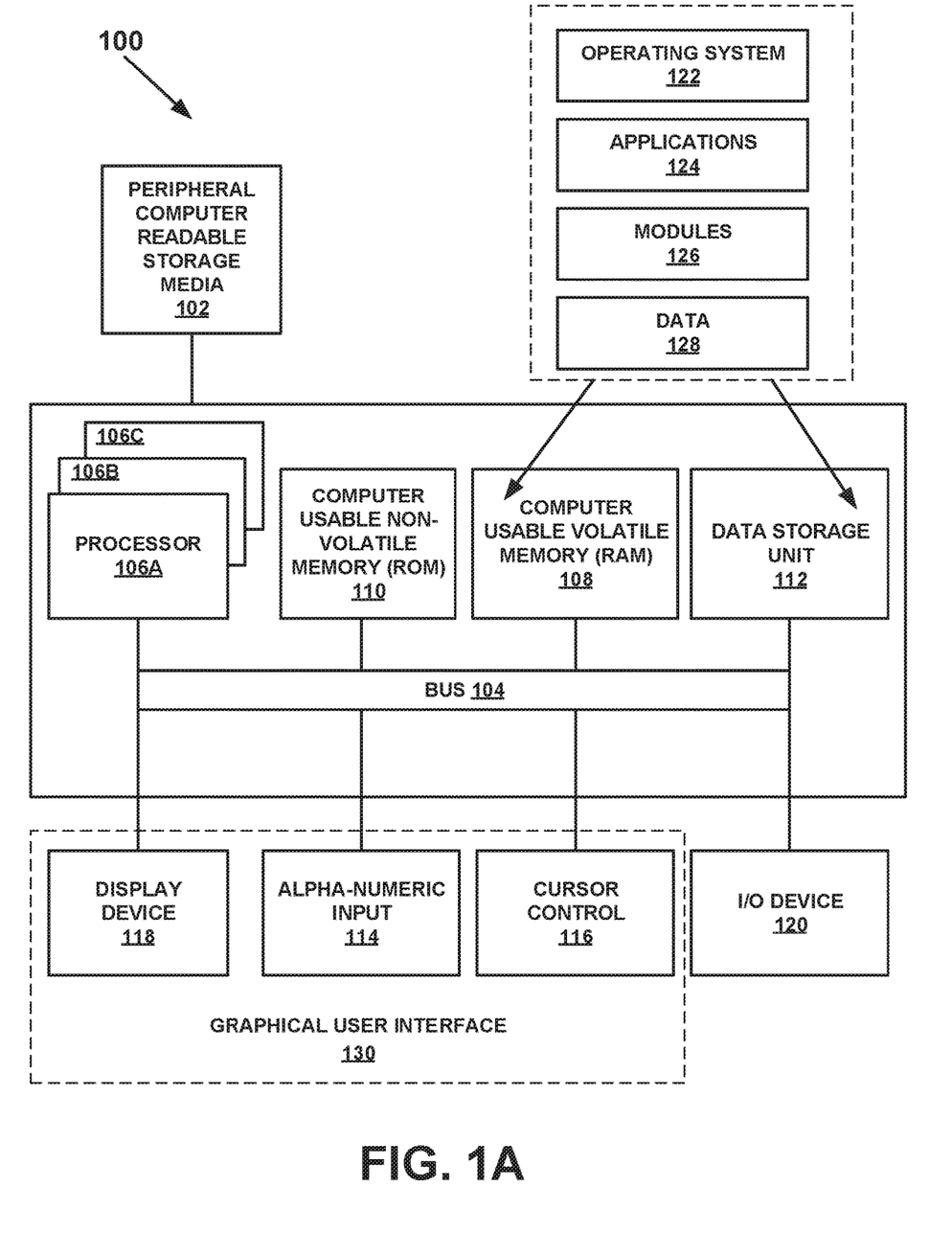
FIG. 1A illustrates an example computer system upon which embodiments described herein be implemented.

Turning now to the figures, FIG. 1A is a block diagram of an example computer system 100 upon which embodiments of the present invention can be implemented. FIG. 1A illustrates one example of a type of computer system 100 (e.g., a computer system) that can be used in accordance with or to implement various embodiments which are discussed herein.

It is appreciated that computer system 100 of FIG. 1A is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand alone computer systems, media centers, handheld computer systems, multi-media devices, and the like. In some embodiments, computer system 100 of FIG. 1A is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Computer system 100 of FIG. 1A includes an address/data bus 104 for communicating information, and a processor 106A coupled with bus 104 for processing information and instructions. As depicted in FIG. 1A, computer system 100 is also well suited to a multi-processor environment in which a plurality of processors 106A, 1066, and 106C are present. Conversely, computer system 100 is also well suited to having a single processor such as, for example, processor 106A. Processors 106A, 106B, and 106C may be any of various types of microprocessors. Computer system 100 also includes data storage features such as a computer usable volatile memory 108, e.g., random access memory (RAM), coupled with bus 104 for storing information and instructions for processors 106A, 1066, and 106C. Computer system 100 also includes computer usable non-volatile memory 110, e.g., read only memory (ROM), coupled with bus 104 for storing static information and instructions for processors 106A, 106B, and 106C. Also present in computer system 100 is a data storage unit 112 (e.g., a magnetic or optical disc and disc drive) coupled with bus 104 for storing information and instructions. Computer system 100 also includes an alphanumeric input device 114 including alphanumeric and function keys coupled with bus 104 for communicating information and command selections to processor 106A or processors 106A, 106B, and 106C. Computer system 100 also includes an cursor control device 116 coupled with bus 104 for communicating user input information and command selections to processor 106A or processors 106A, 106B, and 106C. In one embodiment, computer system 100 also includes a display device 118 coupled with bus 104 for displaying information.

Referring still to FIG. 1A, display device 118 of FIG. 1A may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. Computer system 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with computer system 100 through graphical representations presented on display device 118 by interacting with alphanumeric input device 114 and/or cursor control device 116.

Computer system 100 also includes an I/O device 120 for coupling computer system 100 with external entities. For example, in one embodiment, I/O device 120 is a modem for enabling wired or wireless communications between computer system 100 and an external network such as, but not limited to, the Internet. In one embodiment, I/O device 120 includes a transmitter. Computer system 100 may communicate with a network by transmitting data via I/O device 120.

Referring still to FIG. 1A, various other components are depicted for computer system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 1B:
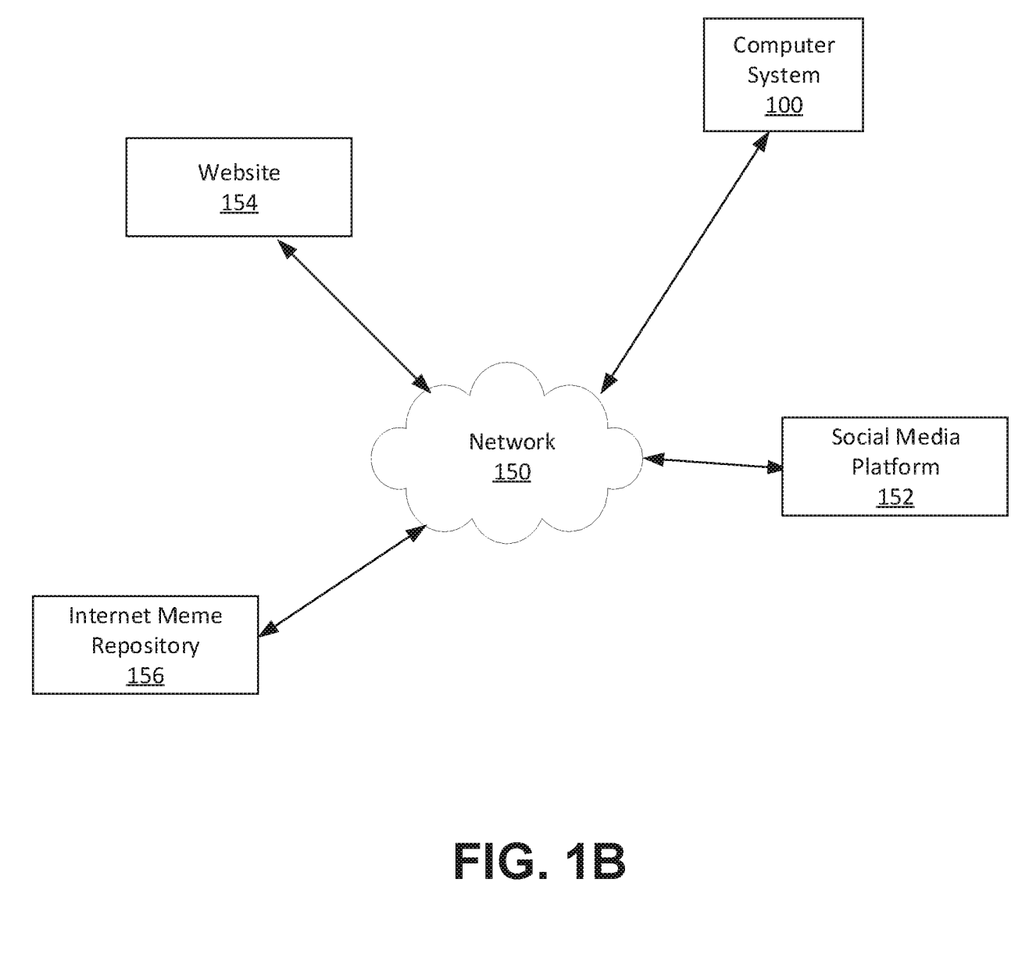
FIG. 1B illustrates an example communication network upon which embodiments described herein may be implemented

FIG. 1B illustrates an example communication network 150 upon which embodiments described herein may be implemented. FIG. 1B illustrates computer system 100, social media platform 152, website 154, and Internet meme repository 156, all of which are communicatively coupled via network 150. It should be appreciated that social media platform 152, website 154, and Internet meme repository 156, may be maintained and served by an instance of a computer system 100 or another computer system.

In one embodiment, social media platform 152, website 154, and Internet meme repository 156 are monitored by computer system 100. Computer system 100 monitors social media platform 152, website 154, and Internet meme repository 156, for digital visual content including a visual moment and a caption. The visual moment can be any type of file that can be rendered on an electronic device (e.g., an image file or a video file). It should be appreciated that any type of media file format can be used in accordance with the described embodiments, including but not limited to Graphics Interchange Format (GIF), WebM, WebP, MPEG-4 (MP4), Animated Portable Network Graphics (APNG), Motion JPEG, Flash video (FLV), Windows Media video, M4V, etc.

Example System for Identification and Tracking of Internet Memes

Figure 2:
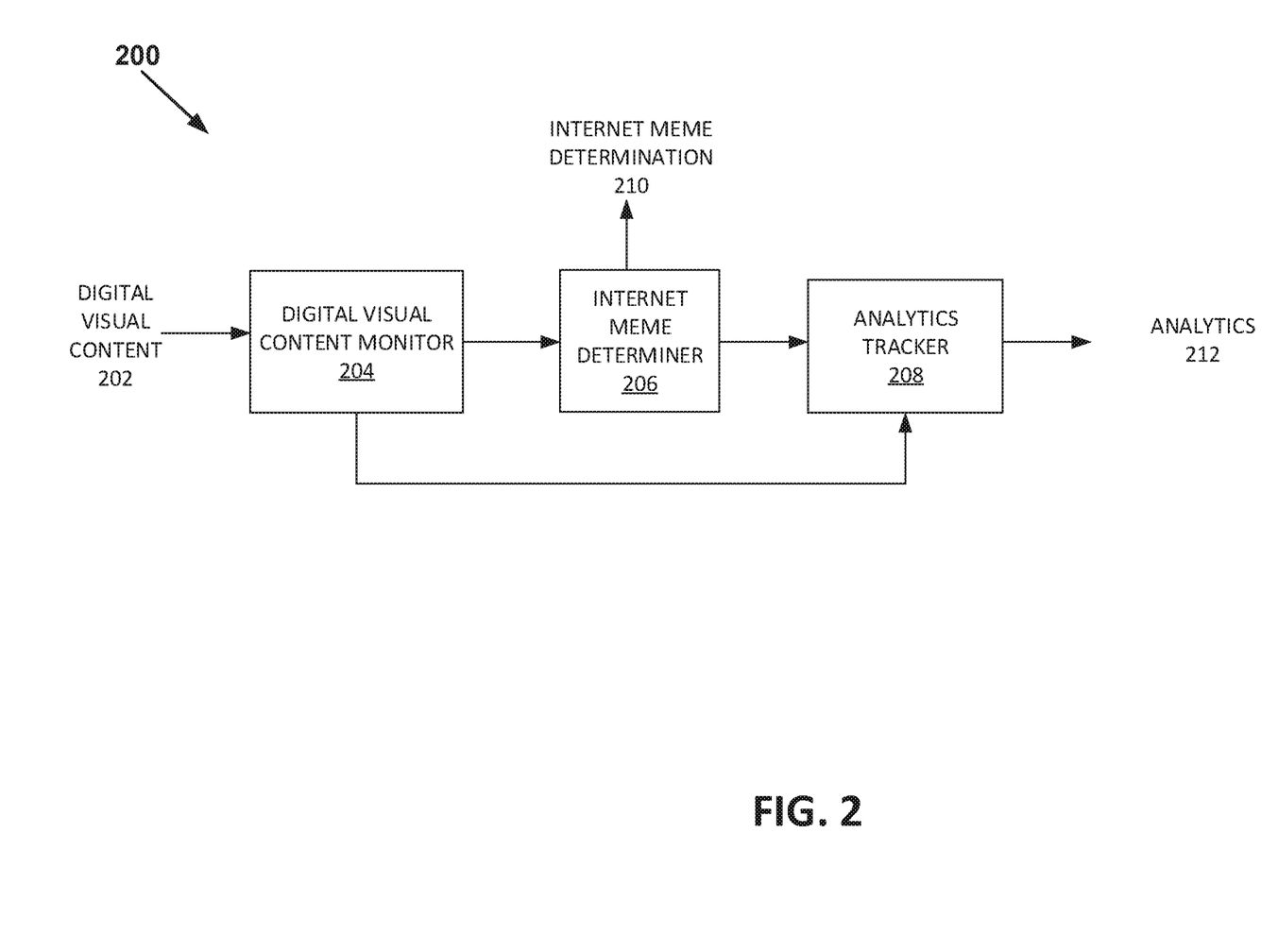
FIG. 2 is a block diagram illustrating a system for identifying and tracking Internet memes, in accordance with embodiments.

FIG. 2 is a block diagram illustrating a system 200 for identifying and tracking Internet memes, in accordance with embodiments. System 200 is configured to perform a novel process of identifying altered and tracking Internet memes which is necessarily rooted in computer technology to overcome a problem specifically arising in the realm of the analysis of digital video content items. In one embodiment, system 200 provides an Internet meme determination 210 for digital visual content 202. System 200 includes digital visual content monitor 204, Internet meme determiner 206, and analytics tracker 208. System 200 can be implemented by a computer system, e.g., computer system 100, to access digital visual content from known sources over the Internet, to identify and track Internet memes. Although shown as separate components in FIG. 2, digital video content item digital visual content monitor 204, Internet meme determiner 206, and analytics tracker 208, can be implemented as a single component or as any other combination of components for performing the described functionality.

In the example shown in FIG. 2, digital visual content 202 is accessed at digital visual content monitor 204. In one embodiment, digital visual content 202 is provided by a user via a client computer system. In other embodiments, digital visual content 202 is received in response to digital visual content monitor accessing known sources, such as websites, social media networks, Internet meme repositories, or other sources of digital visual content. It should be appreciated that digital visual content 202 can be accessed or received using different methods and responsive to different conditions.

In some embodiments, digital visual content 202 is an image file. In some embodiments, digital visual content 202 is a video file, such as a GIF file. While embodiments described herein pertain to GIF files, it should be appreciated that other types of prerecorded media files, such as other types of video files, can be used herein. Moreover, it should be appreciated that any type of media file format can be used in accordance with the described embodiments, including but not limited to GIF, WebM, WebP, MPEG-4 (MP4), APNG, Motion JPEG, Flash video (FLV), Windows Media video, M4V, etc. It should be appreciated that digital visual content 202 can be looped (e.g., via a HTML 5 video element or Flash video element) to automatically repeat. In some embodiments, the digital visual content 202 is a short form looping video file (e.g., less than 60 seconds).

With reference to FIG. 2, Internet meme determiner 206 handles identifying a whether digital visual content 202 is an Internet meme. In some embodiments, Internet meme determiner 206 determines whether digital visual content 202 includes a same visual moment as other instances of digital visual content. Provided the instances of digital visual content include the same visual moment, it is determined that digital visual content 202 is identified as similar digital visual content to the corresponding digital visual content.

Internet meme determiner 206 is also configured to track each instance of similar digital visual content. This tracking enables the determination as to whether a new instance of digital visual content (or an instance of digital visual content not previously identified as an Internet meme) is an Internet meme. Provided a total number of instances of the similar digital visual content exceeds an Internet meme threshold (e.g., 10 instances), the similar digital visual content is identified as an Internet meme, wherein the same visual moment is a root visual moment and each caption corresponds to a different iteration of the Internet meme. Internet meme determiner 206 is configured to generate Internet meme determination 210 indicating whether digital visual content 202 is an Internet meme.

In accordance with some embodiment, Internet meme determiner 206 is configured to identify new Internet memes as they are created, in real time. An Internet meme for this purpose is an image or video (a visual moment) that becomes a template for Internet users to re-iterate with different captions. A root visual moment (e.g., an image or a video) is identified, where the identification is based on visual similarity. In some embodiments, a machine learning engine is used that generates a visual tensor. Every tensor has a distance metric, such that between any two images a distance can be calculated. The visual tensor has the following properties:

Identical binary files will have identical tensors;
Tensors for visually identical content that is saved in different formats will have identical or near identical tensors; and
Minor visual alterations, such as changing resolution, changing colors, or altering parts of the content, will result in tensors that have a very low distance score between one another, and can confidently be called the same.

A determination whether the same root visual moment is re-iterated with a variation is then made. In one embodiment, this determination detects whether the visual content is the same but text is different. In another embodiment, this determination detects whether the visual content is close to the same but measurably different. Mathematically, this means clusters of tensors that have distance measure less than X but greater than Y, where X and Y are chosen such that new variations are likely to be greater than X, but unrelated content is likely to be greater than Y.

In other embodiments, Internet meme determiner 206 is configured to determine whether digital visual content 202 is an instance of a previously identified Internet meme by comparing digital visual content 202 to identify Internet memes.

Figure 3:
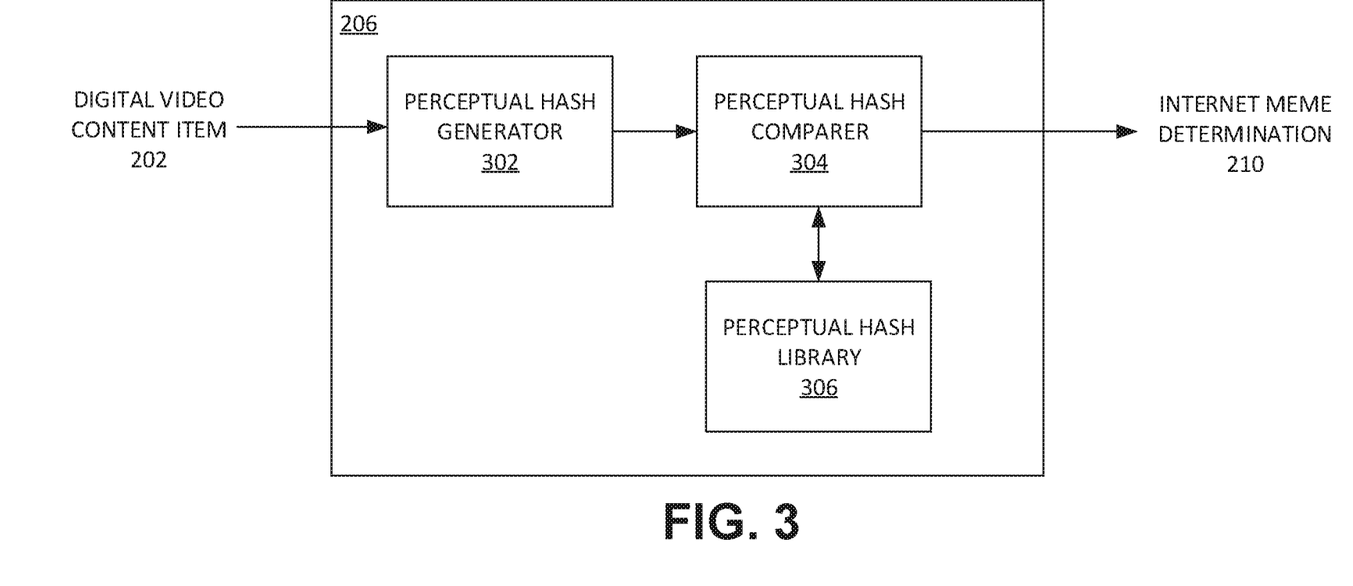
FIG. 3 is a block diagram illustrating an Internet meme determiner of a system for identifying an Internet meme, in accordance with embodiments.

FIG. 3 is a block diagram illustrating Internet meme determiner 206 of a system 200 for identifying an Internet meme, in accordance with embodiments. In one embodiment, Internet meme determiner 206 receives digital visual content 202. Perceptual hash generator 302 generates a perceptual hash for digital visual content 202. Perceptual hash generator 302 is configured to generate perceptual hashes for digital visual content 202. In some embodiments, where digital visual content 202 is a video file, multiple perceptual hashes corresponding to frames of the video file may be generated. Perceptual hashing, as utilized herein, refers to an algorithm or function that is applied to a media file for generating a fingerprint or signature for the media file where the greater the similarity between two media files, the greater the similarity between the perceptual hashes for the two media files. In some embodiments, the output of a perceptual hashing function is a string or sequence, referred to herein as a perceptual hash. For example, two images that are visually similar to a person will have perceptual hashes that are similar, while two images that are visually much different to a person will have perceptual hashes that are less similar. Perceptual hashing can be contrasted with cryptographic hashing where slight variances in the input drastically change the output. Perceptual hashing is useful in determining whether two images are similar. Example perceptual hash functions include phash and dhash, but other types of perceptual hash functions exist and may be utilized herein, in accordance with the described embodiments. In various embodiments, perceptual hashing is utilized in the context of video files by generating perceptual hashes for frames of the video files.

In accordance with various embodiments described herein, similarity between media files, e.g., images or frames of videos, is determined by comparing perceptual hashes for the media files. Perceptual hash comparer 304 is configured to compare the perceptual hash of digital visual content 202 to previously generated perceptual hashes corresponding to other digital visual content (some of which may be identified as Internet memes) stored in a perceptual hash library 306. An edit distance, also referred to herein as a "distance," between the perceptual hashes is determined. As utilized herein, an edit distance refers to a measure of difference between two sequences or strings. For example, edit distance is a measurement of how dissimilar two strings or sequences are to one another by counting the minimum number of operations required to transform one string into the other. Various types distance determinations may be utilized in accordance with the described embodiments, including and without limitation, the Levenshtein distance, the Hamming distance, the Damerau-Levenshtein distance, and the longest common sequence (LCS).

The edit distance between the perceptual hash for digital visual content 202 and perceptual hashes of perceptual hash library 306 is determined. Provided the edit distance between two perceptual hashes satisfies a similarity threshold, it is determined that the instances of digital visual content corresponding to the perceptual hashes include the same visual moment. It should be appreciated that the similarity threshold allows for minor differences in the digital visual content, and can be tuned according to various confidence levels. For instance, if the two perceptual hashes are identical, it is determined that the instances of digital visual content are identical, and refer to the same image. If the two perceptual hashes are not identical, but satisfy the similarity threshold, the instances of digital visual content may include the same underlying visual moment, but include a different caption, and are determined to be different instances of the same digital visual content.

As described above, if it is determined that the number of different instances of the same digital visual content exceeds an Internet meme threshold (e.g., 10 instances), the similar digital visual content is identified as an Internet meme, wherein the same visual moment is a root visual moment and each caption corresponds to a different iteration of the Internet meme.

Figure 4A:
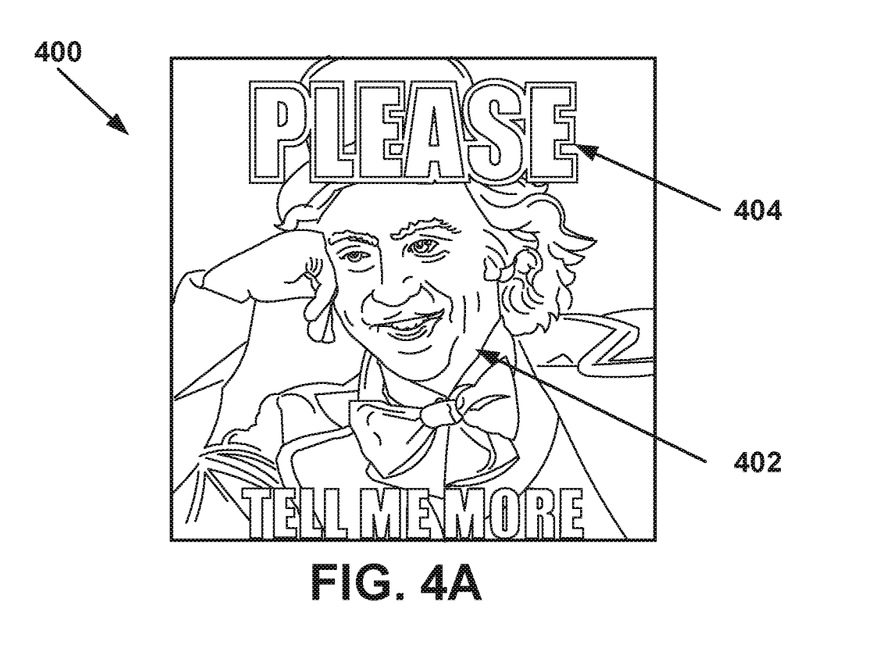
FIGS. 4A and 4B illustrate examples of different iterations of the same Internet meme, according to some embodiments.
Figure 4B:
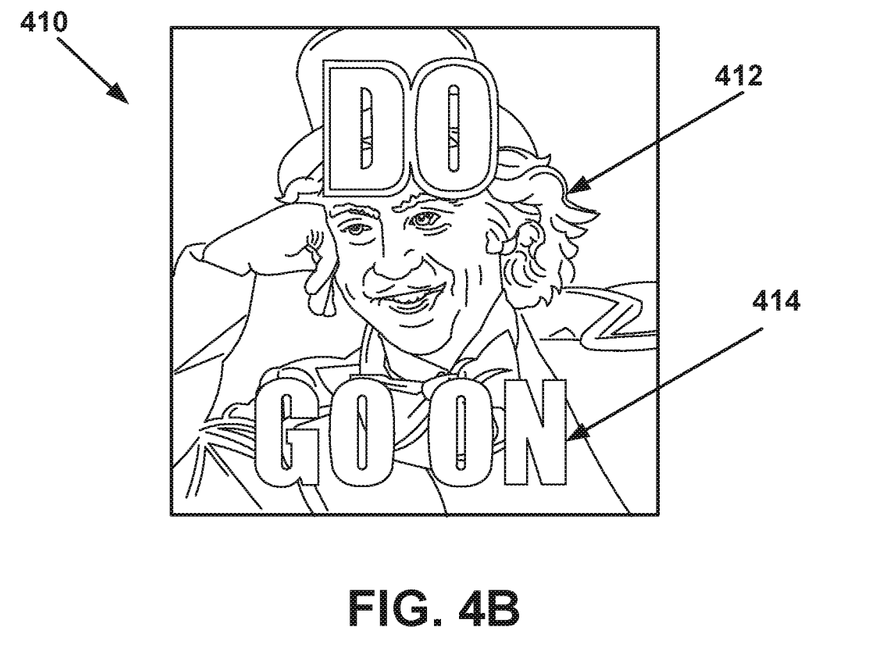

With reference to FIGS. 4A and 4B, examples of different iterations of the same Internet meme are illustrated, according to some embodiments. As illustrated in FIG. 4A, a digital image 400 is illustrated, where the underlying moment 402 of digital image 400 includes the actor Gene Wilder portraying the character Willy Wonka, and a caption 404 reciting the phrase "please tell me more." As illustrated in FIG. 4B, a digital image 410 is illustrated, where the underlying moment 412 of digital image 410 includes the actor Gene Wilder portraying the character Willy Wonka, and a caption 414 reciting the phrase "do go on." Underlying moments 402 and 412, as illustrated, are identical and are the same underlying moment, while captions 404 and 414 are different. As such, in accordance with the described embodiments, digital images 400 and 410 are difference instances of the same Internet meme.

With reference again to FIG. 2, analytics tracker 208 is configured to track each instance of each Internet meme at the known sources, including the tracking of each iteration of each Internet meme. Analytics 212 are generated by analytics tracker 208, where analytics 212 includes objective data quantifying the reach and virality of each Internet meme (and each iteration of each Internet meme).

In some embodiments, having identified Internet memes, each individual Internet meme is then tracked and recorded over time. These measures include the total number of iterations of the Internet meme, the reach of each iteration of the Internet meme, and a total score for each Internet meme based on the number of iterations and the reach of the Internet meme.

Total number of iterations of the Internet meme: Recording when each iteration of an Internet meme occurs. In some embodiments, an iteration is only counted if it is generated by a different social media account than previous iterations. Iterations of the Internet meme can include Internet memes that are a literal derivative of an image or video. For example, when someone has used an Internet meme template with an image or video to alter it and make a derivative. An example would be an image of Donald Trump and Nancy Pelosi at the 2020 State of the Union—one image (roughly) is used and people alter it with different text captions or effects. Iterations of the Internet meme can also include related Internet memes that are copied in style but not from the exact same source image or video of the original meme. An example of this would be Donald Trump's exaggerated hand movements while giving a speech OR Meryl Streep's scream scene in Big Little Lies.

The reach of each iteration. In some embodiments, the reach is calculated using: 1) engagement measures from each social media platform, e.g., likes on Facebook, Twitter and Instagram, upvotes on Reddit, number of comment replies on 4chan; 2) the total number of actual views on an Internet meme repository, e.g., Gfycat/Memento or otherwise, when that data is available; and 3) each measure is normalized using weighted rankings. For example, for a set of existing Gfycat posts on twitter, the number of Retweets and Likes is read and correlate that to the average retweet per view and average like per view.

A total score is calculated combining iterations and reach. The intent of the score is to objectively measure cultural impact, so that it is very unlikely for a high impact meme to have a low score, and very unlikely for a low impact meme to high score. The formula can be stated in the most generic way as satisfying these conditions:

For one iteration: social_score=f(ikes,Shares,Views) where f is some strictly increasing monotonic function.

For the collection of all iterations of one meme: total_score=f({a,b,c, ... }) where {a,b,c, ... } is the N sized collection of social_score values for each iteration of the meme and f is some monotonic function that is (a) strictly increasing according to the inputs (Likes, Shares, Views) of each social_score and (b) strictly increasing according to N, the size of the collection, which by definition is the total number of iterations of the meme.

An example formula satisfying these conditions is the simple sum of scores of each iteration, with each score the simple sum of social engagement numbers.

As presented above, identification and tracking of Internet memes is important for determining the reach an effectiveness of Internet memes. Providing objective measurements on the virality of a meme is important for facilitating the creation and promotion of Internet memes. In particular, providing measurable data on the volume and exposure of Internet memes improves the accuracy of the performance of an Internet meme, providing insight to Internet meme creators and promotors that was not previously available. Hence, the embodiments of the present invention greatly extend beyond conventional methods of identification and tracking of Internet memes. Moreover, embodiments of the present invention amount to significantly more than merely using a computer to perform identification and tracking of Internet memes. Instead, embodiments of the present invention specifically recite a novel process, rooted in computer technology, utilizing objective identification and tracking of Internet memes across multiple websites and social media platforms to determine an objective determination of virality of Internet memes.

Example Operations of Identifying and Tracking Internet Memes

The following discussion sets forth in detail the operation of some example methods of operation of embodiments. With reference to FIGS. 5 through 8, flow diagrams 500, 600, 700, and 800 illustrate example procedures used by various embodiments. The flow diagrams 500, 600, 700, and 800 include some procedures that, in various embodiments, are carried out by a processor under the control of computer-readable and computer-executable instructions. In this fashion, procedures described herein and in conjunction with the flow diagrams are, or may be, implemented using a computer, in various embodiments. The computer-readable and computer-executable instructions can reside in any tangible computer readable storage media. Some non-limiting examples of tangible computer readable storage media include random access memory, read only memory, magnetic disks, solid state drives/"disks," and optical disks, any or all of which may be employed with computer environments (e.g., computer system 100). The computer-readable and computer-executable instructions, which reside on tangible computer readable storage media, are used to control or operate in conjunction with, for example, one or some combination of processors of the computer environments and/or virtualized environment. It is appreciated that the processor(s) may be physical or virtual or some combination (it should also be appreciated that a virtual processor is implemented on physical hardware). Although specific procedures are disclosed in the flow diagram, such procedures are examples. That is, embodiments are well suited to performing various other procedures or variations of the procedures recited in the flow diagram. Likewise, in some embodiments, the procedures in flow diagrams 500, 600, 700, and 800 may be performed in an order different than presented and/or not all of the procedures described in flow diagrams 500, 600, 700, and 800 may be performed. It is further appreciated that procedures described in flow diagrams 500, 600, 700, and 800 may be implemented in hardware, or a combination of hardware with firmware and/or software provided by computer system 100.

Figure 5:
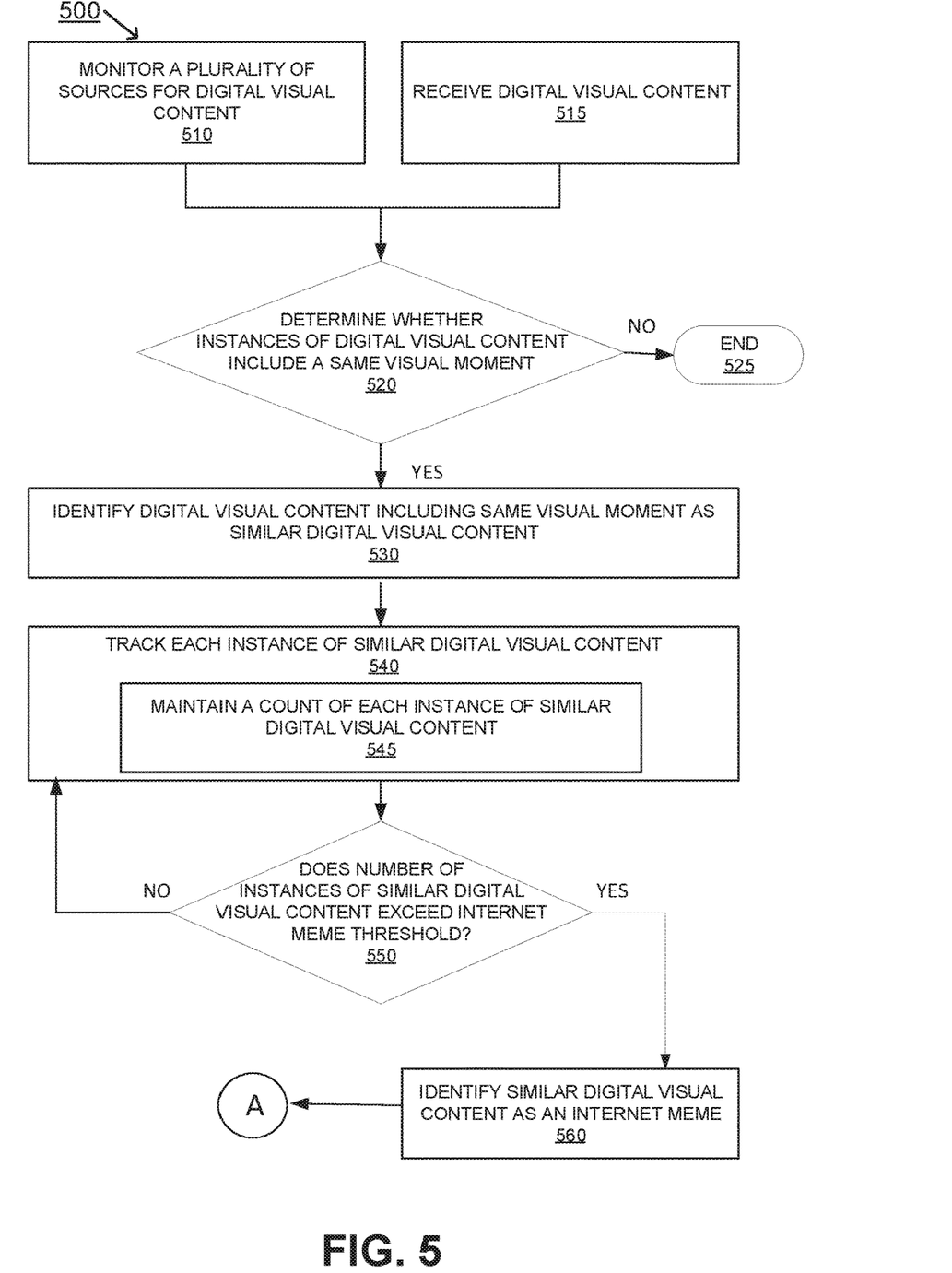
FIG. 5 illustrates a flow diagram of an example method for identifying an Internet meme, according to various embodiments

FIG. 5 illustrates a flow diagram 500 of an example method for identifying an Internet meme, according to various embodiments. At procedure 510, a plurality of sources are monitored for digital visual content comprising a visual moment and a caption. In accordance with various embodiments, the plurality of sources include websites and social media sites. In one embodiment, as shown at procedure 515, an instance digital visual content is received. In one embodiment, the digital visual content includes an image. In another embodiment, the digital visual content includes a video. In one embodiment, the video is a short form looping video content item.

At procedure 520, it is determined whether instances of digital visual content include a same visual moment. If it is determined that instances digital visual content do not include a same visual moment, flow diagram 500 ends, as shown at procedure 525. Alternatively, if it is determined that instances digital visual content does include a same visual moment, flow diagram 500 proceeds to procedure 530. In one embodiment, procedure 520 is performed according to flow diagram 600 of FIG. 6.

Figure 6:
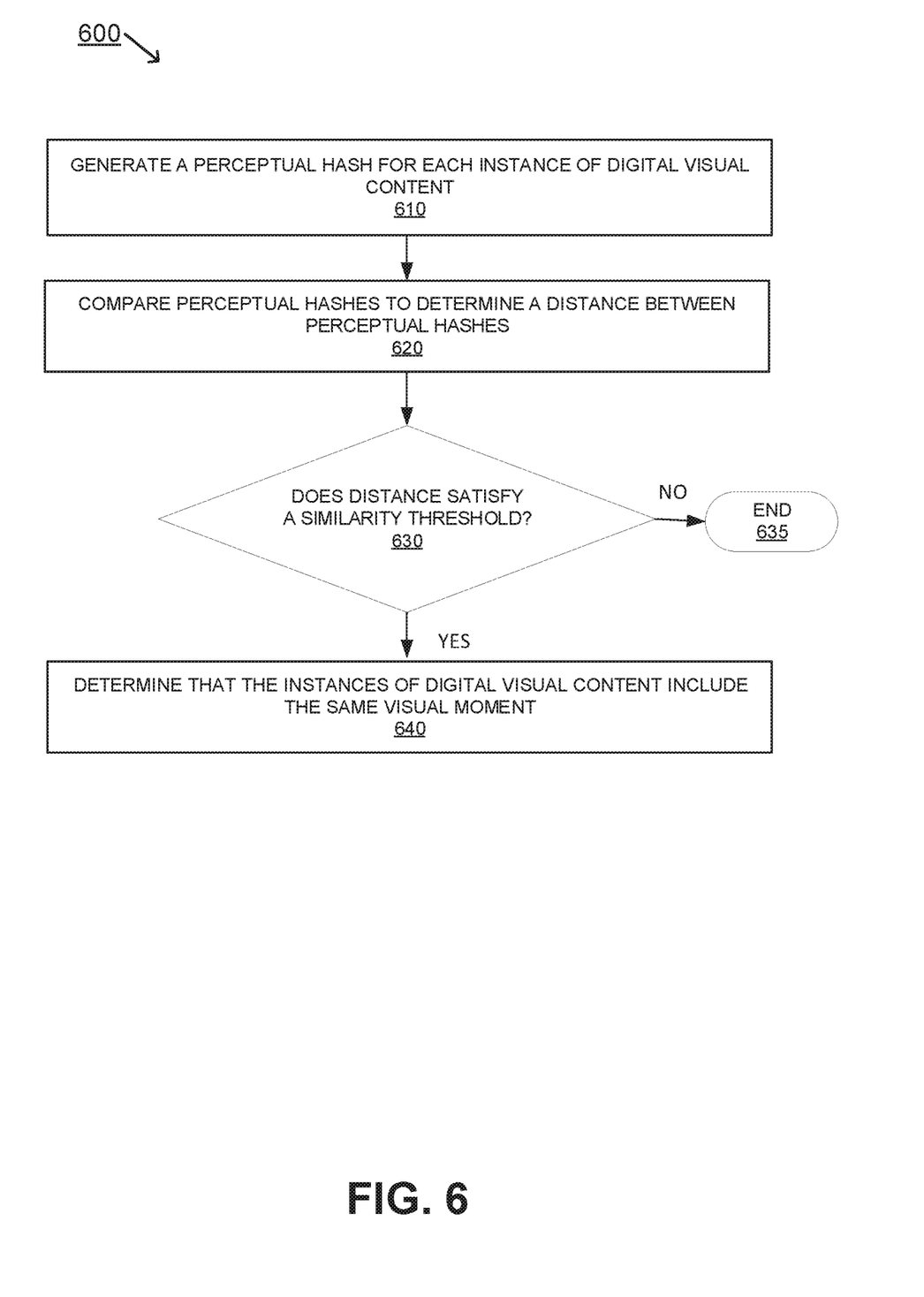
FIG. 6 illustrates a flow diagram of an example method for determining whether instances of digital visual content includes the same visual moment, according to various embodiments.

FIG. 6 illustrates a flow diagram 600 of an example method for determining whether instances of digital visual content includes the same visual moment, according to various embodiments. At procedure 610, a perceptual hash is generated for each instance of digital visual content. At procedure 620, perceptual hashes for each instance of the digital visual content are compared to determine a distance between the perceptual hashes. At procedure 630, it is determined whether the distance satisfies a similarity threshold. Provided the distance between two perceptual hashes does not satisfy a similarity threshold, flow diagram 600 ends, as shown at procedure 635. Provided the distance between two perceptual hashes satisfies a similarity threshold, as shown at procedure 640, it is determined that the instances of digital visual content corresponding to the perceptual hashes include the same visual moment.

With reference to FIG. 5, at procedure 530, provided the instances of digital visual content include the same visual moment, the instances of digital visual content including the same visual moment are identified as similar digital visual content. In one embodiment, provided the distance between two perceptual hashes satisfies the similarity threshold, as shown at procedure 630, the instances of digital visual content corresponding to the perceptual hashes are identified as similar digital visual content.

At procedure 540, each instance of the similar digital visual content is tracked. In one embodiment, as shown at procedure 545, a count of each instance of the similar digital visual content is maintained. At procedure 550, it is determined whether the number of instances of the similar digital visual content exceeds an Internet meme threshold. Provided a total number of instances of the similar digital visual content does not exceed an Internet meme threshold, flow diagram 500 returns to procedure 540. Provided a total number of instances of the similar digital visual content exceeds an Internet meme threshold, as shown at procedure 560, the similar digital visual content is identified as an Internet meme, wherein the same visual moment is a root visual moment and each caption corresponds to a different iteration of the Internet meme.

Figure 7:
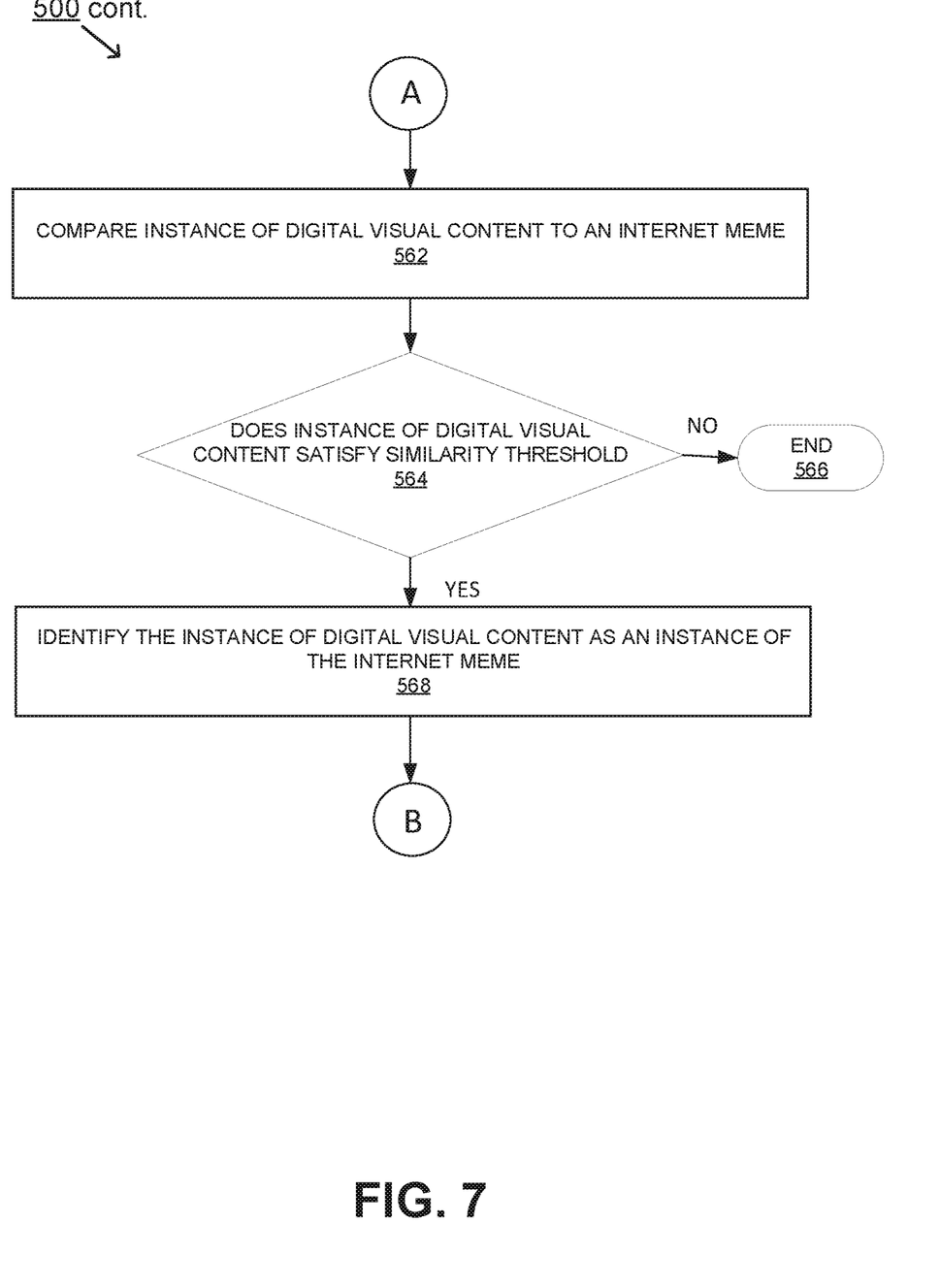
FIG. 7 illustrates a continuation of the flow diagram of FIG. 5 illustrating an example method for determining whether an instance of digital visual content is an instance of an identified Internet meme, according to various embodiments.

FIG. 7 illustrates a continuation of flow diagram 500 of an example method for determining whether an instance of digital visual content is an instance of an identified Internet meme, according to various embodiments. At procedure 562, an instance of digital visual content is compared to an Internet meme. At procedure 564, it is determined whether the instance of digital visual content satisfies a similarity threshold with the Internet meme. If it is determined that the instance of digital visual content does not satisfy the similarity threshold, flow diagram 500 ends, as shown at procedure 566. If it is determined that the instance of digital visual content does satisfy the similarity threshold, as shown at procedure 568, the instance of digital visual content is identified as an instance of the Internet meme. In one embodiment, it is determined whether the instance of the Internet meme is identical to another instance of the Internet meme. Provided the instance of the Internet meme is not identical to another instance of the Internet meme, it is determined that the instance of the Internet meme is a new iteration of the Internet meme. Provided the instance of the Internet meme is identical to another instance of the Internet meme, it is determined that the instance of the Internet meme is another instance of an existing iteration of the Internet meme.

Figure 8:
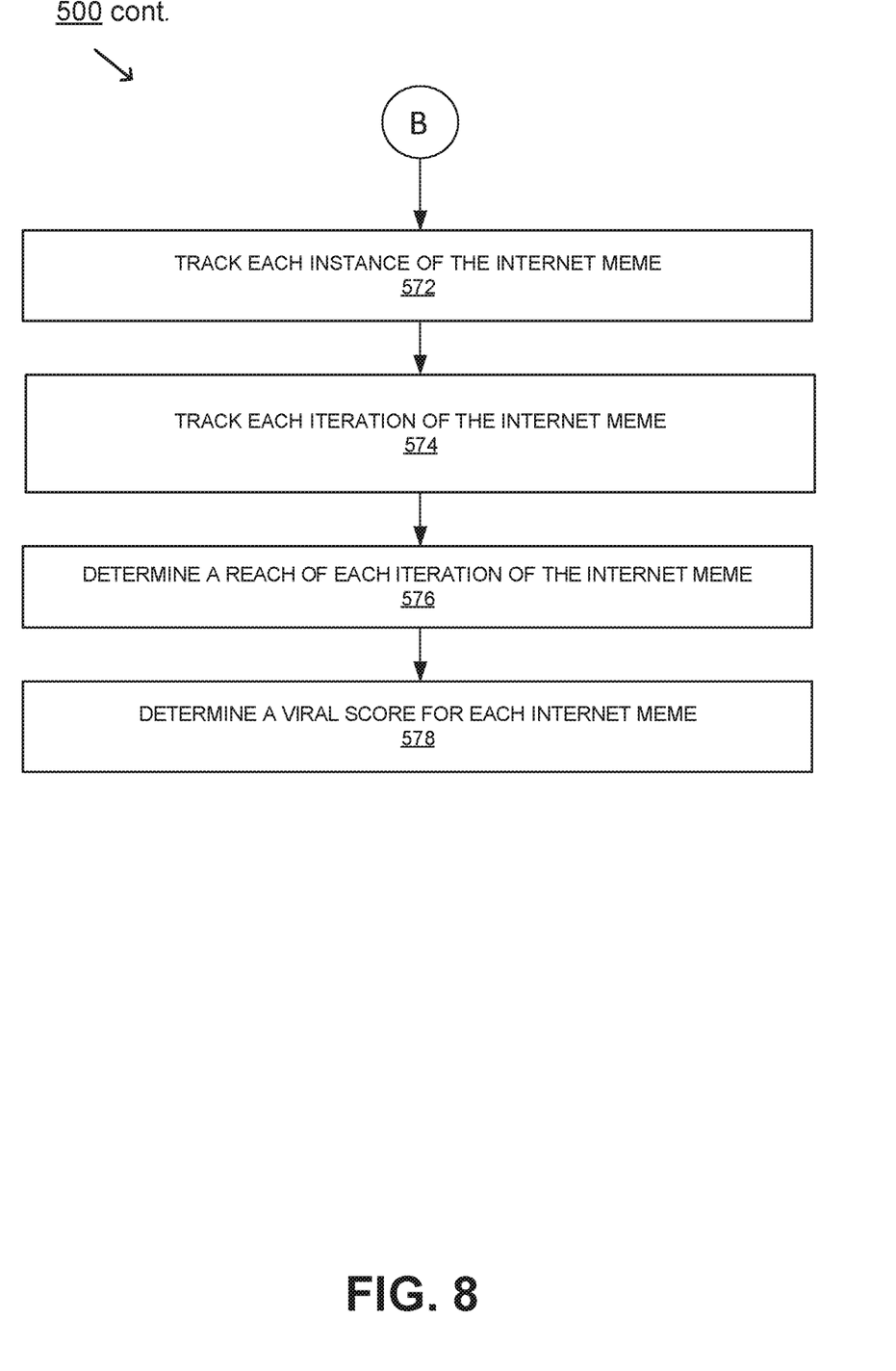
FIG. 8 illustrates a continuation of the flow diagram of FIG. 5 illustrating an example method for tracking an Internet meme, according to various embodiments.

FIG. 8 illustrates a continuation of flow diagram 500 of an example method for tracking an Internet meme, according to various embodiments. At procedure 572, each instance of the Internet meme is tracked at the plurality of sources. At procedure 574, each iteration of the Internet meme is tracked. At procedure 576, a reach of each iteration of the Internet meme is determined, wherein the reach of each iteration of the Internet meme corresponds to engagement with each iteration of the Internet meme. In one embodiment, as shown at procedure 578, a viral score for each Internet meme is calculate, the viral score including a first component associated with the reach of each iteration of the Internet meme and a second component associated with a number of iterations of each Internet meme.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A method for identification of an Internet meme, the method comprising:
   monitoring a plurality of sources for digital visual content comprising a visual moment and a caption;
   determining whether instances of digital visual content include a same visual moment;
   provided the instances of digital visual content include the same visual moment, identifying the instances of digital visual content including the same visual moment as similar digital visual content;
   tracking each instance of the similar digital visual content;
   provided a total number of instances of the similar digital visual content exceeds an Internet meme threshold, identifying the similar digital visual content as an Internet meme, wherein the same visual moment is a root visual moment and each caption corresponds to a different iteration of the Internet meme;
   comparing an instance of digital visual content to an Internet meme; and
   provided the instance of digital visual content satisfies a similarit threshold, identifying the instance of digital visual content as an instance of the Internet meme;
   determining whether an instance of the Internet meme is identical to another instance of the Internet meme;
   provided the instance of the Internet meme is not identical to another instance of the Internet meme, determining that the instance of the Internet meme is a new iteration of the Internet meme; and
   provided the instance of the Internet meme is identical to another instance of the Internet meme, determining that the instance of the Internet meme is another instance of an existing iteration of the Internet meme.

2. The method of claim 1, wherein the determining whether instances of digital visual content include a same visual moment comprises:
   generating a perceptual hash for each instance of digital visual content;
   comparing perceptual hashes for each instance of the digital visual content to determine a distance between the perceptual hashes; and
   provided the distance between two perceptual hashes satisfies a similarity threshold, determining that the instances of digital visual content corresponding to the perceptual hashes include the same visual moment.

3. The method of claim 2, wherein the identifying the instances of digital visual content including the same visual moment as similar digital visual content comprises:
   provided the distance between two perceptual hashes satisfies the similarity threshold, identifying the instances of digital visual content corresponding to the two perceptual hashes as similar digital visual content.

4. The method of claim 1, wherein the plurality of sources comprises websites and social media sites.

5. The method of claim 1, wherein the digital visual content comprises an image.

6. The method of claim 1, wherein the digital visual content comprises a video.

7. The method of claim 6, wherein the video is a short form looping video content item.

8. The method of claim 1, wherein the tracking each instance of the similar digital visual content comprises:
   maintaining a count of each instance of the similar digital visual content.

9. The method of claim 1, further comprising:
tracking each instance of the Internet meme at the plurality of sources;
tracking each iteration of the Internet meme; and
determining a reach of each iteration of the Internet meme, wherein the reach of each iteration of the Internet meme corresponds to engagement with each iteration of the Internet meme.

10. The method of claim 1, further comprising:
calculating a viral score for each Internet meme, the viral score comprising a first component associated with a reach of each iteration of the Internet meme and a second component associated with a number of iterations of each Internet meme.

11. The method of claim 1, further comprising:
receiving an instance of digital visual content.

12. A non-transitory computer readable storage medium having computer readable program code stored thereon for causing a computer system to perform a method for identification of an Internet meme, the method comprising:
monitoring a plurality of sources for digital visual content comprising a visual moment and a caption;
determining whether instances of digital visual content include a same visual moment;
provided the instances of digital visual content include the same visual moment, identifying the instances of digital visual content including the same visual moment as similar digital visual content;
tracking each instance of the similar digital visual content;
provided a total number of instances of the similar digital visual content exceeds an Internet meme threshold, identifying the similar digital visual content as an Internet meme, wherein the same visual moment is a root visual moment and each caption corresponds to a different iteration of the Internet meme;
comparing an instance of digital visual content to the Internet meme; and
provided the instance of di ital visual content satisfies a similarity threshold, identifying the instance of digital visual content as an instance of the Internet meme;
determining whether an instance of the Internet meme is identical to another instance of the Internet meme;
provided the instance of the Internet meme is not identical to another instance of the Internet meme, determining that the instance of the Internet meme is a new iteration of the Internet meme; and
provided the instance of the Internet meme is identical to another instance of the Internet meme, determining that the instance of the Internet meme is another instance of an existing iteration of the Internet meme.

13. The non-transitory computer readable storage medium of claim 12, wherein the determining whether instances of digital visual content include a same visual moment comprises:
generating a perceptual hash for each instance of digital visual content;
comparing perceptual hashes for each instance of the digital visual content to determine a distance between the perceptual hashes; and
provided the distance between two perceptual hashes satisfies a similarity threshold, determining that the instances of digital visual content corresponding to the perceptual hashes include the same visual moment.

14. The non-transitory computer readable storage medium of claim 13, wherein the identifying the instances of digital visual content including the same visual moment as similar digital visual content comprises:
provided the distance between two perceptual hashes satisfies the similarity threshold, identifying the instances of digital visual content corresponding to the two perceptual hashes as similar digital visual content.

15. The non-transitory computer readable storage medium of claim 12, the method further comprising:
tracking each instance of the Internet meme at the plurality of sources;
tracking each iteration of the Internet meme;
determining a reach of each iteration of the Internet meme, wherein the reach of each iteration of the Internet meme corresponds to engagement with each iteration of the Internet meme; and
calculating a viral score for each Internet meme, the viral score comprising a first component associated with the reach of each iteration of the Internet meme and a second component associated with a number of iterations of each Internet meme.

16. A computer system comprising:
a data storage unit; and
a processor coupled with the data storage unit, the processor configured to:
monitor a plurality of sources for digital visual content comprising a visual moment and a caption;
generate a perceptual hash for each instance of digital visual content;
compare perceptual hashes for each instance of the digital visual content to determine a distance between the perceptual hashes;
provided the distance between two perceptual hashes satisfies a similarity threshold, determine that the instances of digital visual content corresponding to the two perceptual hashes include a same visual moment and identifying the instances of digital visual content corresponding to the two perceptual hashes as similar digital visual content;
track each instance of the similar digital visual content;
provided a total number of instances of the similar digital visual content exceeds an Internet meme threshold, identify the similar digital visual content as an Internet meme, wherein the same visual moment is a root visual moment and each caption corresponds to a different iteration of the Internet meme;
comparing an instance of digital visual content to the Internet meme; and
provided the instance of digital visual content satisfies a similarity threshold, identifying the instance of digital visual content as an instance of the Internet meme,
deteimining whether an instance of the Internet meme is identical to another instance of the Internet meme;
provided the instance of the Internet meme is not identical to another instance of the Internet meme, determinin that the instance of the Internet meme is a new iteration of the Internet meme; and
provided the instance of the Internet meme is identical to another instance of the Internet meme, deteiinining that the instance of the Internet meme is another instance of an existing iteration of the Internet meme.

* * * * *

UNITED STATES PATENT AND TRADEMARK OFFICE
CERTIFICATE OF CORRECTION

PATENT NO. : 11,281,934 B2
APPLICATION NO. : 16/799641
DATED : March 22, 2022
INVENTOR(S) : Harris et al.

It is certified that error appears in the above-identified patent and that said Letters Patent is hereby corrected as shown below:

On the Title Page

Item (72), in "Inventors", in Column 1, Line 3, delete "Fairfield (CA);" and insert --Fairfield, CA (US);-- therefor Item (72), in "Inventors", in Column 1, Line 4, delete "Northridge (CA)" and insert --Northridge, CA (US)-- therefor In the Claims In Column 16, Line 25, in Claim 1, delete "similarit" and insert --similarity-- therefor In Column 17, Line 38, in Claim 12, delete "di ital" and insert --digital-- therefor In Column 18, Line 52, in Claim 16, delete "meme," and insert --meme;-- therefor In Column 18, Line 53, in Claim 16, delete "deteimining" and insert --determining-- therefor In Column 18, Line 56, in Claim 16, delete "determinin" and insert --determining-- therefor In Column 18, Line 60, in Claim 16, delete "deteiinining" and insert --determining-- therefor Signed and Sealed this
Twenty-first Day of June, 2022

Katherine Kelly Vidal
*Director of the United States Patent and Trademark Office*